United States Patent
Chen et al.

(10) Patent No.: US 11,943,525 B2
(45) Date of Patent: Mar. 26, 2024

(54) ELECTRONIC CAMERA MODULE WITH INTEGRAL LED AND LIGHT-PIPE ILLUMINATOR

(71) Applicant: OmniVision Technologies, Inc., Santa Clara, CA (US)

(72) Inventors: Teng-Sheng Chen, Hsinchu (TW); Wei-Ping Chen, New Taipei (TW); Jau-Jan Deng, Taipei (TW); Wei-Feng Lin, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/674,675

(22) Filed: Feb. 17, 2022

(65) Prior Publication Data

US 2023/0262310 A1 Aug. 17, 2023

(51) Int. Cl.
*H04N 23/50* (2023.01)
*H04N 23/55* (2023.01)
(Continued)

(52) U.S. Cl.
CPC ........... *H04N 23/555* (2023.01); *H04N 23/55* (2023.01); *H04N 23/56* (2023.01); *H04N 23/57* (2023.01)

(58) Field of Classification Search
CPC ........ H04N 23/56; H04N 23/55; H04N 23/57; H04N 23/555; H04N 23/60; H04N 23/70; A61B 1/0125; A61B 2017/00296; A61B 1/00059; A61B 1/00064; A61B 1/0011; A61B 1/00114; A61B 1/00117; A61B 1/00119; A61B 1/0661; A61B 1/0669; A61B 1/0676; A61B 1/0684; A61B 1/0692; A61B 1/06; A61B 1/07

See application file for complete search history.

(56) References Cited

U.S. PATENT DOCUMENTS 8,870,753 B2 * 10/2014 Boulais .............. A61B 1/00105
600/156
9,538,909 B2   1/2017 Lei et al.
(Continued)

FOREIGN PATENT DOCUMENTS

EP    1839559 B1    9/2015
EP    2687144 B1    11/2017
WO  WO 2018/136950 A1  7/2018

OTHER PUBLICATIONS

U.S. Appl. No. 17/504,105 Final Office Action dated Jul. 27, 2023, 16 pages.
(Continued)

*Primary Examiner* — Abdelaaziz Tissire
(74) *Attorney, Agent, or Firm* — COZEN O'CONNOR

(57) ABSTRACT

An electronic camera assembly includes a camera chip cube bonded to camera bondpads of an interposer; at least one light-emitting diode (LED) bonded to LED bondpads of the interposer at the same height as the camera bondpads; and a housing extending from the interposer and LEDs to the height of the camera chip cube, with light guides extending from the LEDs through the housing to a top of the housing. In embodiments, the electronic camera assembly includes a cable coupled to the interposer. In typical embodiments the camera chip cube has footprint dimensions of less than three and a half millimeters square.

17 Claims, 4 Drawing Sheets

(51) Int. Cl.
*H04N 23/56* (2023.01)
*H04N 23/57* (2023.01)

(56) References Cited

U.S. PATENT DOCUMENTS

| | | | |
|---|---|---|---|
| 9,913,573 B2 | 3/2018 | Banik et al. | |
| 10,924,640 B2* | 2/2021 | Shimohata | A61B 1/00114 |
| 11,147,437 B1* | 10/2021 | Ochi | A61B 1/00096 |
| 11,172,806 B2 | 11/2021 | Chen et al. | |
| 2003/0220574 A1 | 11/2003 | Markus et al. | |
| 2003/0227547 A1* | 12/2003 | Iddan | A61B 1/051 |
| | | | 348/E5.029 |
| 2004/0038447 A1* | 2/2004 | Corisis | H01L 23/3128 |
| | | | 438/106 |
| 2004/0233319 A1* | 11/2004 | You | H04N 23/55 |
| | | | 348/340 |
| 2005/0143623 A1 | 6/2005 | Kojima | |
| 2005/0174473 A1* | 8/2005 | Morgan | H05B 45/355 |
| | | | 348/370 |
| 2005/0236708 A1* | 10/2005 | Farnworth | H01L 27/14618 |
| | | | 257/723 |
| 2005/0267328 A1 | 12/2005 | Blumzvig et al. | |
| 2005/0275748 A1* | 12/2005 | Takekuma | H04N 23/56 |
| | | | 348/370 |
| 2007/0206114 A1* | 9/2007 | Tanaka | H04N 23/56 |
| | | | 396/176 |
| 2008/0255416 A1 | 10/2008 | Gilboa | |
| 2009/0153729 A1* | 6/2009 | Hiltunen | G03B 15/05 |
| | | | 348/E5.022 |
| 2012/0148225 A1* | 6/2012 | Chow | H04M 1/0264 |
| | | | 396/176 |
| 2013/0258182 A1* | 10/2013 | Lin | H04N 23/50 |
| | | | 348/374 |
| 2014/0098208 A1 | 4/2014 | Makino | |
| 2016/0112622 A1* | 4/2016 | Gressum | H04N 23/71 |
| | | | 348/370 |
| 2017/0150873 A1* | 6/2017 | Tatebayashi | A61B 1/05 |
| 2017/0307848 A1* | 10/2017 | Ida | G02B 9/14 |
| 2017/0310890 A1 | 10/2017 | Wan et al. | |
| 2018/0070806 A1 | 3/2018 | Matsuo et al. | |
| 2018/0317756 A1* | 11/2018 | Unsai | H04N 23/54 |
| 2019/0089875 A1 | 3/2019 | Fan | |
| 2019/0246884 A1* | 8/2019 | Lu | A61B 1/00105 |
| 2020/0274995 A1* | 8/2020 | Coleman | H04N 23/54 |
| 2021/0037169 A1 | 2/2021 | Numasawa et al. | |
| 2021/0217795 A1* | 7/2021 | Takada | H01L 27/14636 |
| 2021/0242099 A1 | 8/2021 | Takeshita | |
| 2021/0249393 A1 | 8/2021 | Wu et al. | |
| 2022/0061645 A1* | 3/2022 | Jochumsen | A61B 1/07 |

OTHER PUBLICATIONS

U.S. Appl. No. 17/504,105 Office Action dated Dec. 21, 2022, 13 pages.

* cited by examiner

ELECTRONIC CAMERA MODULE WITH INTEGRAL LED AND LIGHT-PIPE ILLUMINATOR

BACKGROUND

We have introduced a family of very small "chip cube" electronic cameras; these electronic cameras have dimensions on the order of from less than one millimeter to 3.5 millimeters, these cameras have typically footprint less than 3.5 millimeters square with multiple offerings under 2 millimeters square and including some offerings with footprints less than one millimeter square. Height is proportional to footprint dimensions and is also quite small. For example, but not limitation, our Omnivision OVM6946 Camera-CubeChip® (trademark of Omnivision, Santa Clara, Calif.) provides 400×400-pixel resolution at 30 frames per second in a package 1.05 millimeter square and 2.27 millimeters tall, and our OVM6948 camera chip cube provides 200× 200-pixel resolution video images in a package 0.65 millimeters square and 1.15 millimeters tall. Some of these CameraChipCubes are color cameras and some provide respectable quantum efficiency performance from blue visible light to 940 nm infrared. We expect to introduce additional, small, camera chip cubes in the future.

Such small cameras have applications in endoscopes, including bronchoscopes, falloposcopes, and colonoscopes as well as laparoscopes and arthroscopes, where they can replace relatively bulky, historical, alternatives such as lenses focused onto coherent optical-fiber bundles that bring images from small probes inside a human or animal body to cameras outside the body. They can also be used in many non-medical applications such as but not limited to borescopes for engine inspection, drain inspection snakes, and grabbing tools. For example, a building inspector could inspect studs within a wall for termite or mold damage through an easily concealed hole no larger than that made by a 10d framing nail, and a plumber could run a camera-equipped snake through a sewer to determine nature of an obstruction.

These camera chip cubes are typically formed from a semiconductor wafer of ball-bondable image sensor integrated circuits by attaching to the semiconductor wafer a wafer of spacers topped by a wafer of lenses, then dicing the wafers into individual cameras.

Such chip-cube cameras typically require illumination and careful assembly; ball bonding connections having dimensions on the order of tenths of a millimeter with similar connection pitch can be a challenge for some customers.

SUMMARY

In an embodiment, an electronic camera assembly includes a camera chip cube bonded to camera bondpads of an interposer; at least one light-emitting diode (LED) bonded to LED bondpads of the interposer at the same height as the camera bondpads; and a housing extending from the interposer and LEDs to the height of the camera chip cube, with light guides extending from the LEDs through the housing to a top of the housing. In embodiments, the electronic camera assembly includes a cable coupled to the interposer. In typical embodiments the camera chip cube has footprint dimensions of less than three and a half millimeters square, in other embodiments the camera chip cube has dimensions less than two, or even less than one, millimeter square.

DETAILED DESCRIPTION

While we can sell bare camera chip cubes, we also propose prefabricated camera/cable/illuminator assemblies. In making these assemblies, we leverage our experience with microelectronics, ball-bonding, precision molding, and thin-film processing.

Figure 1:
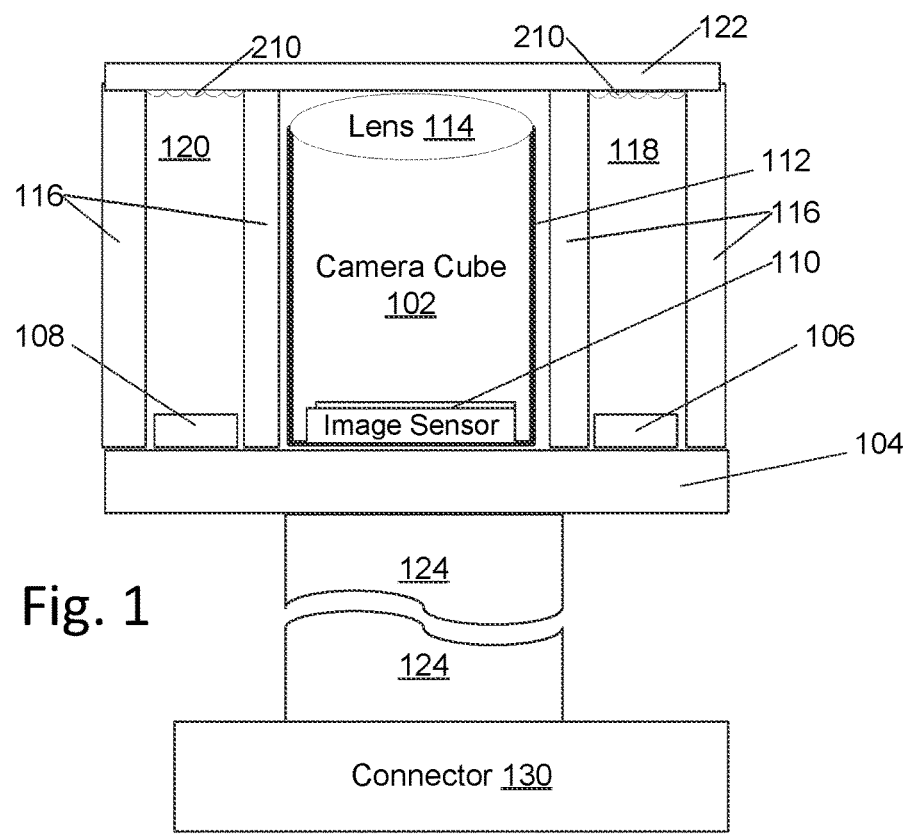
FIG. 1 is a cross sectional schematic diagram illustrating an embodiment of a cable, camera, and LED illuminator with light guide structures.

These assemblies, as illustrated in FIG. 1, include a camera chip cube 102 mounted on an interposer 104, along with at least one light-emitting diode (LED) 106, 108. Camera chip cube 102 includes an image sensor 110, a spacer 112, and a lens 114. Camera chip cube 102 is contained within a housing 116, with LEDs 106, 108 at the bottom of tubular light guide structures 118, 120 within housing 116. Across top of the housing 116, covering both the camera chip cube 102 and the LEDs 106, 108 with their light guide structures 118, 120, is sealed a transparent window 122. Attached to the interposer 104 is a cable containing several conductors that are electrically coupled through conductors within interposer 104 to ball-type bondpads of camera chip cube 102 to power the camera chip cube and receive images from the camera chip cube 102 as a serial analog or digital signal. Conductors of the cable are also coupled through conductors of the interposer to either directly in some embodiments, or through transistors within camera chip cube 102 in alternative embodiments, provide power to LEDs 106 or 108. In typical embodiments, cable 124 has five to seven wires and terminates in a connector 130, connector 130 being adapted for connection to an ancillary cable-module adapter board that provides power to the camera/cable/illuminator assembly, receives images therefrom, stores and processes the images for display, and displays the processed images to a user.

Each LED illuminator 200 (FIG. 2) with LED 106, 108, 202 and light guide structure 118, 120, 204 is formed in an opening 206 in housing 116, 208. An interior surface of the opening 206 is lined with a reflective metal coating 209 to reduce light loss through sides of the light guide structure 204 into housing 208. A microlens array 210 is disposed atop opening 206 and is formed on an underside surface of transparent window 122 to shape the light as it leaves the light guide structure to illuminate objects, if any, in front of camera chip cube 102.

An alternative embodiment 300 (FIG. 3A) of the cable, camera, and LED illuminator assembly with light guide structures has a reflective surface deposited on an exterior of the camera chip cube 302. This embodiment can be more compact than the embodiment of FIG. 1 because, while housing 304 surrounds the light guide structure 318, 320 and camera chip cube 302 there is no need for housing 304 to separate camera chip cube 302 from light guide structure 318. As a result, transparent window 322 may be smaller than the transparent window 122, and the interposer 324 of FIG. 3A may be smaller than interposer 104 of FIG. 1. Components in FIG. 3A are similar to and perform a similar function to components of FIG. 1 having the same reference numbers; the connector is not shown in FIG. 3A for simplicity.

Figure 2:
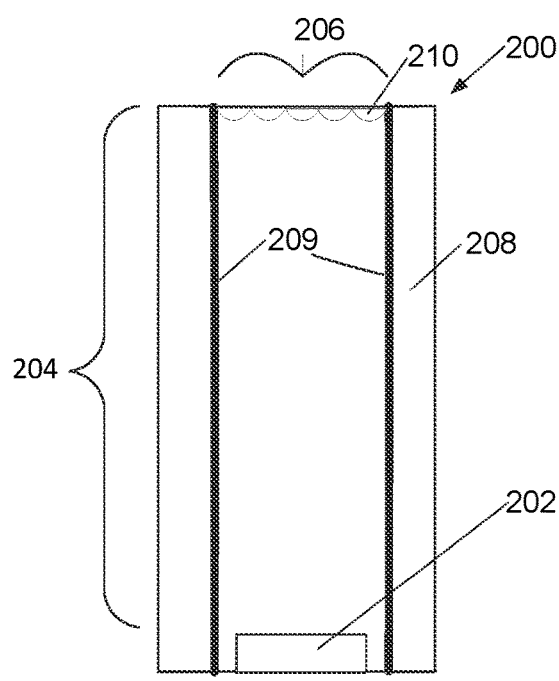
FIG. 2 is a cross sectional schematic diagram illustrating a single LED illuminator with its associated light guide structure such as may be found in the embodiment of FIG. 1.
Figure 3B:
FIG. 3B is a cross sectional schematic of lenses on a transparent window for use in embodiments of FIG. 1, 2, or 3A in place of microlenses.
Figure 3A:
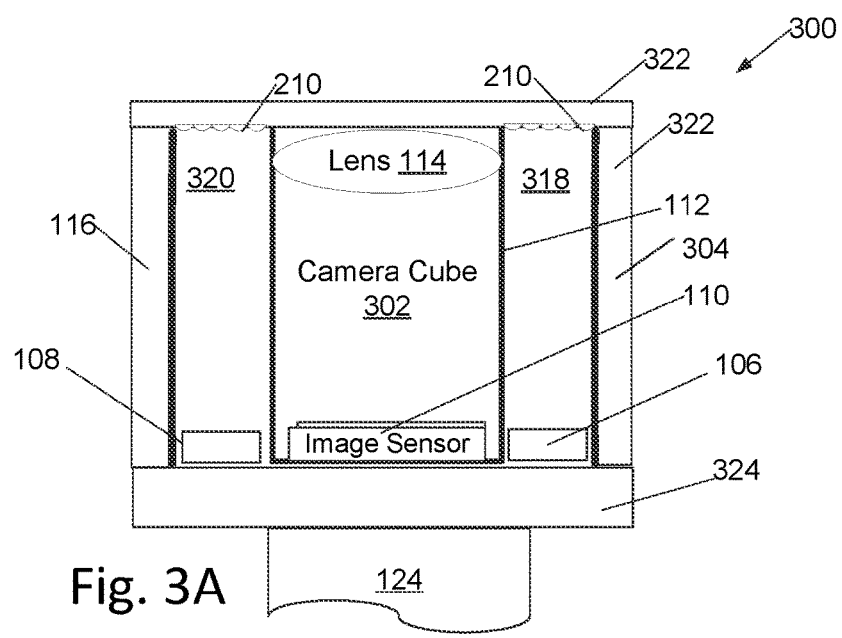
FIG. 3A is a cross sectional schematic diagram illustrating an alternative embodiment of cable, camera, and LED illuminator with light guide structures incorporating a reflective surface deposited on an exterior of a chip-cube camera.
Figure 7:
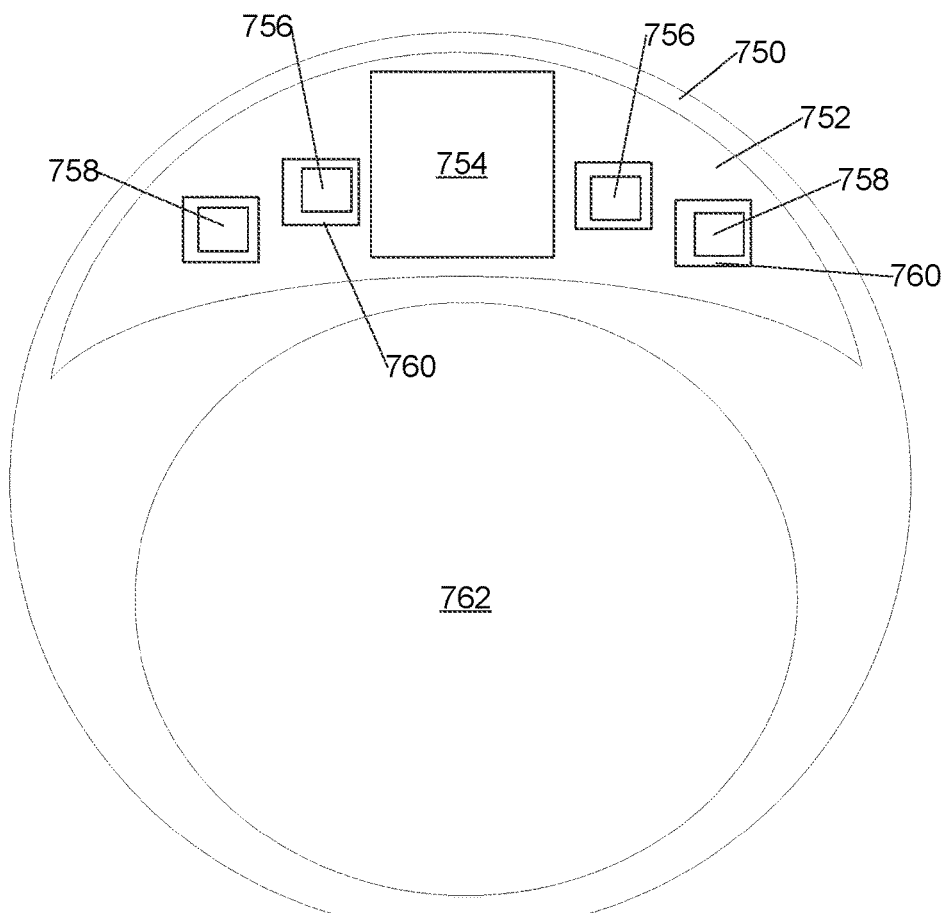
FIG. 7 illustrates an embodiment having an arcuate interposer and housing.
Figure 6:
FIG. 6 illustrates a system incorporating the cameras and interposers herein described.

In alternative embodiments otherwise resembling those of FIGS. 1, 2 and 3A, a single lens 352 (FIG. 3B) replaces microlens array 210 of each light guide structure 118, 120, 318, 320. Single lens 352 or microlens array 210 are typically formed by molding onto transparent window 322, 122 prior to attaching transparent window 122, 322 to housing 304, 116. These microlens arrays 210 and single lens 352 serve to transform a Lambertian light distribution in the light guides into a flat top light distribution to provide good illumination for the camera.

In alternative embodiments otherwise resembling those of FIGS. 1, 2, 3, and 3B, space between reflective-coated walls of the light guide structures 318, 118, 204 is filled with a phosphor. In a particular embodiment, the LEDs 106, 108 are blue-light LEDs and the phosphor converts blue light into a broader-spectrum white light to provide camera chip cube 302 with white illumination so, should chip-cube camera be a color camera, camera chip cube 302 can provide color images.

Hemoglobin absorbs significant short-wavelength visible light but allows some longer wavelengths through. In alternative embodiments, chip-cube camera 302 has a red-green-blue-infrared 4-filter tiling pattern of color filters on photodiodes of its image sensor and can provide red-green-blue-infrared four-color video images. In this embodiment, there may be one or more white LEDs or blue LEDs with associated phosphor provided for color imaging, and one or more infrared LEDs for longer-wavelength infrared imaging to provide short-range imaging through blood.

In alternative embodiments, chip-cube camera 302 has a red/green/blue/fluorescent emissions four-filter tiling pattern of color filters on photodiodes of its image sensor and can provide red-green-blue-fluorescence four-color video images. In this embodiment, there may be one or more white LEDs or blue LEDs with associated phosphor and a fluorescent-emissions blocking filter provided for color imaging, and one or more fluorescent-stimulus wavelength LEDs for longer-wavelength infrared imaging to provide for imaging of fluorophores in medical imaging.

In an alternative embodiment, a precut piece of graded-index optical fiber may be inserted into light guide structure 318 118, 204.

With such techniques, the interposer may have diameter less than 2.1 millimeters with cameras resembling the OVM4946 cameras, or less than 1.7 millimeters with OVM6948 cameras.

Figure 4:
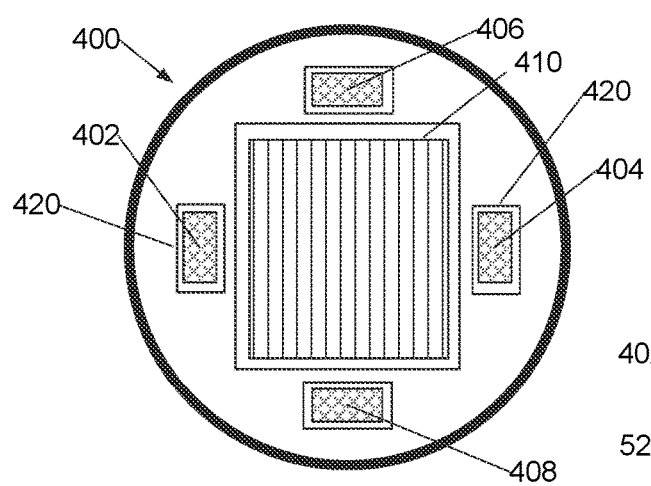
FIG. 4 illustrates a top plan view of a round-interposer and housing embodiment not requiring a reflective surface on the camera chip cube.

In a round-interposer 400 (FIG. 4) embodiment there are a first LED 402, an optional second LED 404, an optional third LED 406, and an optional fourth LED 408, the LEDs flanking a camera cube 410. Each LED is at the base of a light guide structure 420 in a housing having the same external shape as interposer 400.

Figure 5:
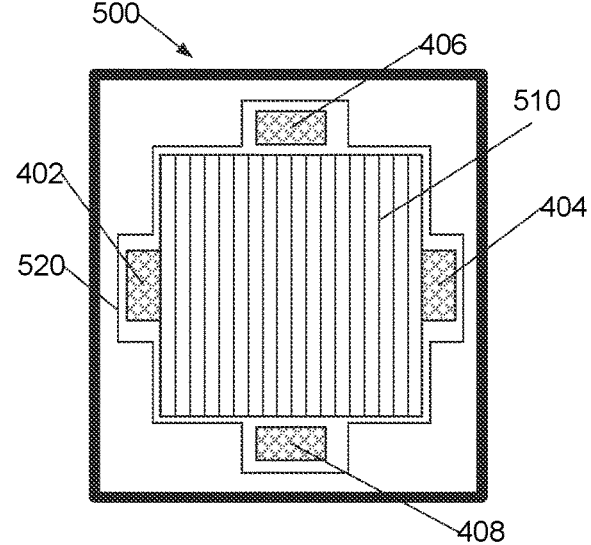
FIG. 5 illustrates a top plan view of a square-interposer and housing embodiment requiring the camera chip cube to have a reflective surface.

In a square-interposer 500 (FIG. 5) embodiment, there also lies beneath the transparent window a first LED 402, an optional second LED 404, an optional third LED 406, and an optional fourth LED 408, the LEDs flanking a camera chip cube 510. In this embodiment, camera chip cube 510 has a reflective outer surface and is enclosed in a housing having a cavity 520 and dimensions similar to those of square interposer 500, cavity 520 having a reflective inner surface; the space between the inner surface of cavity 520 and outer surface of camera chip cube 510 serving as a light guide structure.

The interposer, camera chip cube, and cable assembly 600 forms an end of endoscope 700 with endoscope body 702 and operating handle 706 that may include controls for steering wires, and a connector 708 to an electronic digital image display & processing system 710 that displays images for guidance to a physician or other user.

In another particular embodiment, an endoscope head 750 has an interposer and housing 752 having arcuate shape with camera chip cube 754 surrounded by four LEDs 756, 758 each at the base of a light guide structure 760 as previously described. Arcuate interposer and housing 752 are positioned adjacent a lumen 762 of endoscope 750.

Figure 8:
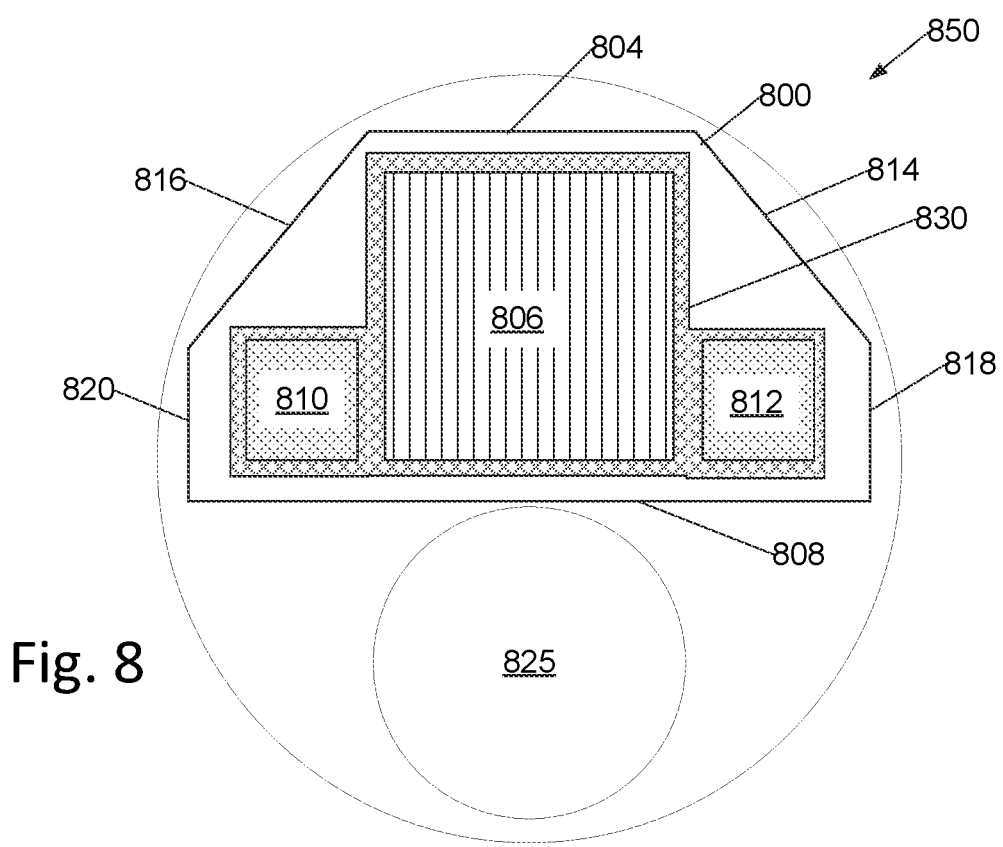
FIG. 8 illustrates an embodiment having a truncated isosceles shaped interposer and housing.

In another particular embodiment, for use in small-diameter endoscope heads like endoscope head 800 (FIG. 8), the interposer and housing has truncated isosceles trapezoidal shape. In these embodiments, a short parallel side 804 of the cavity is configured to be positioned against a curved interior side of endoscope head 800; short parallel side 804 is adjacent camera cube 806. Long parallel side 808 is configured to be positioned more centrally to endoscope head 800 and is adjacent to camera chip cube 806 and two LEDs 810, 812, one LED being positioned on each side of camera chip cube 806 and positioned nearer to long parallel side 808 than to short parallel side 804. Isosceles side 814, 816, extend downward from short parallel side 804 at a 45-degree angle towards, but do not meet, long parallel side 808, and terminate in a vertical truncation side 818, 820 after providing room for LEDs 810, 812. Use of the truncated isosceles trapezoidal shaped interposer and housing may provide more room for endoscope lumens 825 or other functional portions of endoscope head 800 than may be available with a square interposer and housing.

In some embodiments of an endoscope head 850, the camera chip cube 806 has a reflective outer surface and interposer and housing 802 has a cavity 830 lined with a reflective coating, so space between housing 802 and camera chip cube 806 serves as a light guide.

The light guides in the housing herein described permit the camera cube to be bonded to camera bondpads of an interposer, and the light-emitting diodes (LED) to be bonded to LED bondpads of the interposer, with the LED bondpads at the same height as the camera bondpads while directing light onto objects in front of the camera chip cube without a shadow being cast on those objects by the camera chip cube. In the embodiments herein described, the housing and light guides extend from the interposer and LEDs to the height of the camera chip cube, the light guides extending to a top of the housing.

Combinations

The cavity interposer, camera cube, LEDs, and cable herein described may be configured in a number of ways. Among configurations anticipated by the inventors are:

An electronic camera assembly designated A including: a camera chip cube bonded to camera bondpads of an interposer; at least one light-emitting diode (LED) bonded to LED bondpads of the interposer at the same height as the camera bondpads; and a housing extending from the interposer and LEDs to the height of the camera chip cube, and light guides extending from the LEDs to a top of the housing.

An electronic camera assembly designated AA including the electronic camera assembly designated A further comprising a cable coupled to the interposer.

An electronic camera assembly designated AB including the electronic camera assembly designated A or AA wherein the camera chip cube has footprint dimensions of less than three and a half millimeters square.

An electronic camera assembly designated AC including the electronic camera assembly designated AB wherein the camera chip cube has footprint dimensions of less than two millimeters square.

An electronic camera assembly designated AD including the electronic camera assembly designated A, AA, AB, or AC wherein the light guides are topped with an array of microlenses.

An electronic camera assembly designated AE including the electronic camera assembly designated A, AA, AB, or AC wherein the light guides are each topped with a singular lens.

An electronic camera assembly designated AF including the electronic camera assembly designated A, AA, AB, AC, AD, or AE wherein the light guides are formed between a reflective inner surface of a cavity of the housing and a reflective outer surface of the camera chip cube.

An electronic camera assembly designated AG including the electronic camera assembly designated A, AA, AB, AC, AD, or AE wherein the light guides are formed by reflective surfaces of cavities in the housing.

An electronic camera assembly designated AH including the electronic camera assembly designated A, AA, AB, AC, AD, AE, AF, or AG wherein the light guides are filled with a phosphor.

An electronic camera assembly designated AI including the electronic camera assembly designated A, AA, AB, AC, AD, AE, AF, AG, or AH wherein the interposer has an arcuate shape.

An electronic camera assembly designated AJ including the electronic camera assembly designated A, AA, AB, AC, AD, AE, AF, AG, or AH wherein the interposer has a truncated isosceles trapezoid shape.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. It is also anticipated that steps of methods may be performed in an order different from that illustrated and still be within the meaning of the claims that follow.

What is claimed is:

1. An electronic camera assembly comprising:
   a camera chip cube bonded to camera bondpads on a first surface of an interposer;
   at least one light-emitting diode (LED) bonded to LED bondpads of the interposer at a same height as the camera bondpads; and
   a housing extending from the interposer and LEDs to a height of the camera chip cube, light guides extending through the housing from the LEDs to a top of the housing;
   the interposer having a cable coupled to bondpads on a second surface of the interposer, the second surface of the interposer being opposite the first surface of the interposer;
   wherein the light guides are formed between a reflective inner surface of a cavity of the housing and a reflective outer surface of the camera chip cube.

2. The electronic camera assembly of claim 1 wherein the camera chip cube has footprint dimensions of less than three and a half millimeters square.

3. The electronic camera assembly of claim 2 wherein the camera chip cube has footprint dimensions of less than two millimeters square.

4. The electronic camera assembly of claim 3 wherein the interposer has an arcuate shape.

5. The electronic camera assembly of claim 1 wherein the light guides are topped with an array of microlenses.

6. The electronic camera assembly of claim 5 wherein the interposer has an arcuate shape.

7. The electronic camera assembly of claim 1 wherein the light guides are each topped with a singular lens.

8. The electronic camera assembly of claim 1 wherein the light guides are filled with a phosphor.

9. The electronic camera assembly of claim 8 wherein the light guides are topped with an array of microlenses.

10. The electronic camera assembly of claim 8 wherein the light guides are each topped with a singular lens.

11. The electronic camera assembly of claim 1 wherein the interposer has a truncated isosceles trapezoidal shape.

12. An electronic camera assembly comprising:
    a camera chip cube bonded to camera bondpads on a first surface of an interposer;
    at least one light-emitting diode (LED) bonded to LED bondpads of the interposer at a same height as the camera bondpads; and
    a housing extending from the interposer and LEDs to a height of the camera chip cube, light guides extending through the housing from the LEDs to a top of the housing;
    the interposer having a cable coupled to bondpads on a second surface of the interposer, the second surface of the interposer being opposite the first surface of the interposer;
    wherein the interposer has a truncated isosceles trapezoid shape.

13. The electronic camera assembly of claim 12 wherein the light guides are filled with a phosphor.

14. The electronic camera assembly of claim 13 wherein the light guides are formed by reflective surfaces of cavities in the housing.

15. The electronic camera assembly of claim 12 wherein the light guides are formed between a reflective inner surface of a cavity of the housing and a reflective outer surface of the camera chip cube.

16. The electronic camera assembly of claim 15 wherein the light guides are filled with a phosphor.

17. An electronic camera assembly comprising:
a camera chip cube bonded to camera bondpads on a first surface of an interposer;
at least one light-emitting diode (LED) bonded to LED bondpads of the interposer at a same height as the camera bondpads;
a housing extending from the interposer and LEDs to a height of the camera chip cube; and
light guides extending through the housing from the LEDs to a top of the housing;
the interposer having a cable coupled to bondpads on a second surface of the interposer, the second surface of the interposer being opposite the first surface of the interposer;
wherein the light guides are formed by reflective surfaces of cavities in the housing; and
wherein the light guides are filled with a phosphor.

\* \* \* \* \*